(12) United States Patent  (10) Patent No.: US 8,517,248 B2
Zaffino  (45) Date of Patent: Aug. 27, 2013

(54) MOULD WITH CONFORMAL COOLING

(75) Inventor: Pascal Zaffino, Windsor (CA)

(73) Assignee: Ariel Andre Waitzman, Franklin, MI (US)

( * ) Notice: Subject to any disclaimer, the term of this patent is extended or adjusted under 35 U.S.C. 154(b) by 0 days.

(21) Appl. No.: 12/870,017

(22) Filed: Aug. 27, 2010

(65) Prior Publication Data

US 2011/0083823 A1  Apr. 14, 2011

Related U.S. Application Data

(60) Provisional application No. 61/251,498, filed on Oct. 14, 2009.

(51) Int. Cl.
  *B23K 31/02* (2006.01)
  *B22D 27/04* (2006.01)
(52) U.S. Cl.
  USPC .......... 228/141.1; 228/203; 228/13; 164/128; 164/144; 164/443; 164/444
(58) Field of Classification Search
  USPC .............. 164/128, 144, 443, 444; 228/141.1, 228/203, 13
  See application file for complete search history.

(56) References Cited

U.S. PATENT DOCUMENTS

| 4,621,185 | A  | * | 11/1986 | Brown ...................... 219/124.34 |
| 6,112,804 | A  | * | 9/2000  | Sachs et al. .................... 164/348 |
| 7,549,459 | B2 | * | 6/2009  | Sun ................. 164/342 |
| 2003/0022008 | A1 | * | 1/2003 | Jogan et al. ................ 428/472.2 |
| 2005/0072386 | A1 | * | 4/2005 | Gabriel et al. ............. 123/41.35 |
| 2006/0099295 | A1 | * | 5/2006 | Elliott ............................ 425/564 |
| 2011/0024393 | A1 | * | 2/2011 | Cui et al. ..................... 219/76.1 |

FOREIGN PATENT DOCUMENTS

DE  19623148 A1 * 1/1998
JP  60152371 A  * 8/1985

OTHER PUBLICATIONS

Computer english translation of DE 19623148 A1.*
Computer english translation of JP 60152371 A.*

* cited by examiner

*Primary Examiner* — Keith Walker
*Assistant Examiner* — Erin Saad
(74) *Attorney, Agent, or Firm* — Carlson, Gaskey & Olds P.C.

(57) ABSTRACT

A method of providing a mould with a conformal cooling passage includes rough machining a mould cavity generally corresponding to a moulded part shape using CAD data. Conformal cooling slots are cut in the mould cavity using the CAD data. The conformal cooling slots are welded shut using the CAD data to provide conformal cooling passages. A class A surface is machined over the conformal cooling passage and corresponds to a finished mould part shape using the CAD data.

21 Claims, 3 Drawing Sheets

MOULD WITH CONFORMAL COOLING

This application claims priority to U.S. Application No. 61/251,498, which was filed on Oct. 14, 2009.

BACKGROUND

This disclosure relates to moulds having conformal cooling and a method for providing the same.

Moulds, such as those used in plastic injection moulding, are subject to significant heat during the injection moulding process. The moulds are cooled during injection moulding to cool the plastic part and improve cycle times.

Over the years conformal cooling has been used to improve mould cooling by providing more uniform cooling of the part. A conformal cooling approach provides cooling passages that generally conform to or follow the contour of the moulded part beneath the finished mould surface. Since the finished mould surface is of a generally complex shape, it is difficult to provide conformal cooling passages in the desired location. Typically, intersecting passages are gun-drilled into the mould, and then plugged at various locations, to provide the conformal cooling passages. Providing conformal cooling passages in this manner is undesirable due to the large expense, the difficulty in gun-drilling large moulds (such as those used for vehicle bumpers), and the poor approximation of the conformal cooling passages to the finished mould surface.

SUMMARY

A mould with conformal mould cooling passage includes a mould with a cut conformal cooling slot having a surface. Weld beads laid on the surface enclose the cut conformal cooling slot with a metal filler adjoining the cut conformal cooling slot to provide an enclosed conformal cooling passage. A class A machined surface is provided across the weld beads and the mould adjoining the cut conformal cooling slot.

A method of providing a mould with a conformal cooling passage includes rough machining a mould cavity generally corresponding to a moulded part shape using CAD data. Conformal cooling slots are cut in the mould cavity using the CAD data. The conformal cooling slots are welded shut using the CAD data to provide conformal cooling passages. A class A surface is machined over the conformal cooling passage and corresponds to a finished mould part shape using the CAD data.

DETAILED DESCRIPTION

Figure 1A:
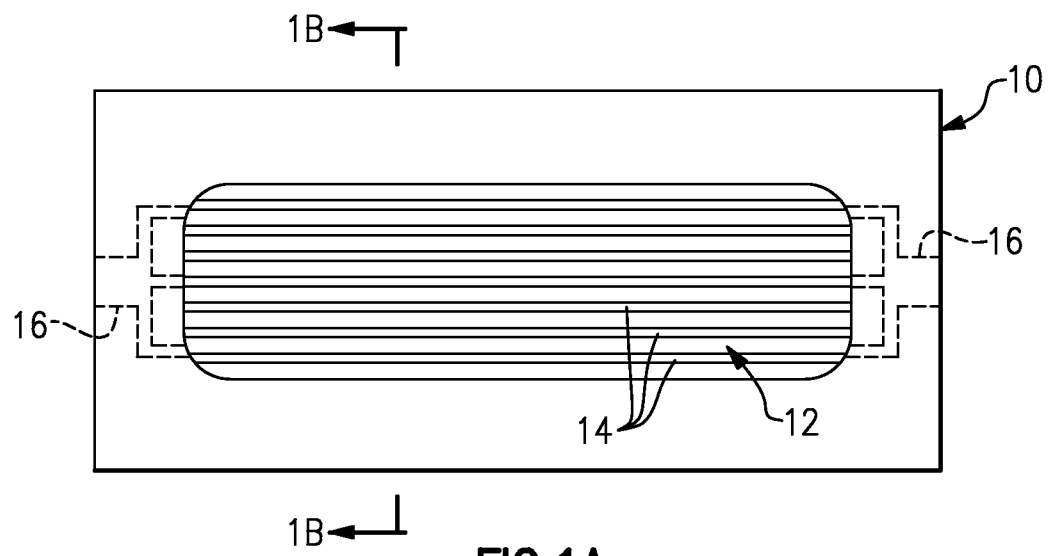
FIG. 1A is a top elevational view of mould with rough mould cavity and cut conformal cooling slots.
Figure 1B:
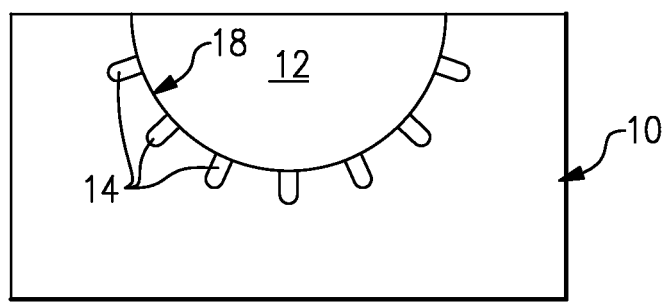
FIG. 1B is a cross-sectional view of the mould in FIG. 1A taken along line 1A-1A.

A mould 10 is shown in FIGS. 1A and 1B that is suitable, for example, for injection moulding. The mould 10 was provided as a blank and machined to provide a rough mould cavity 12 having a rough contoured surface 18 generally corresponding to a shape of a part to be moulded, for example, a vehicle bumper. Cut conformal cooling slots 14 are machined into the rough contoured surface 18 at a first depth 25 of 1.5-2.5 inches, for example. Other fluid passages 16 may be machined to intersect the cut conformal cooling slots 14 to communicate fluid from a cooling fluid source.

Figure 2:
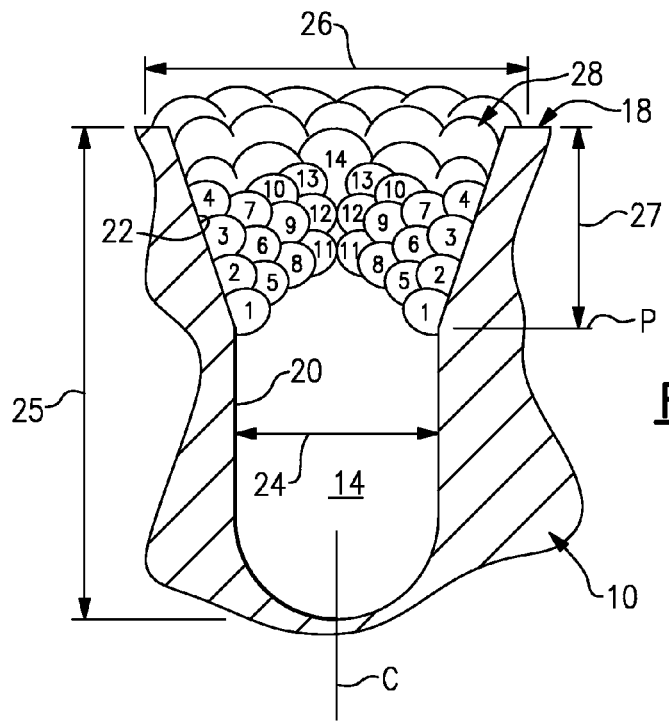
FIG. 2 is a cross-sectional view of a cut conformal cooling slot with weld beads.

An example cut conformal cooling slots 14 is shown in more detail in FIG. 2. The cut conformal cooling slot 14 provides spaced apart lateral walls 20, providing a first width 24, that are generally parallel with one another in the example shown. Spaced apart angled walls 22 adjoin the lateral walls 20 and taper generally away from one another to provide a second width 26 where the angled walls 22 meet the rough contoured surface 18. In one example, the first width 24 is approximately 0.5 inch, and the second width 26 is approximately 0.75 inch at the rough contoured surface 18. The lateral and angled walls 20, 22 may be provided by a single cutting tool.

The angled walls 22 are provided at an angle of approximately 10-20° relative to the lateral wall to provide a surface for welding. The cut conformal cooling slot 14 includes a centerline C, and the angled walls 22 are provided at an angle relative to the centerline C. During welding, the angled walls 22 are arranged at an obtuse angle relative to a true horizontal plane P to reduce the undesired effects of gravity on the weld bead as it transitions from the molten state to solid metal. Weld beads 28 are laid on the angle walls 22 starting at a second depth 27 of approximately 0.5-0.75 inch below the rough contoured surface 18. The weld beads 28 are built up on top of one another, for example, in the number sequence indicated in FIG. 2, until the weld beads are proud of the rough contoured surface. The weld beads 28 are robotically TIG welded onto the mould 10 according to U.S. application Ser. No. 11/924,649, filed Oct. 27, 2007, which is incorporated by reference.

Figure 3:
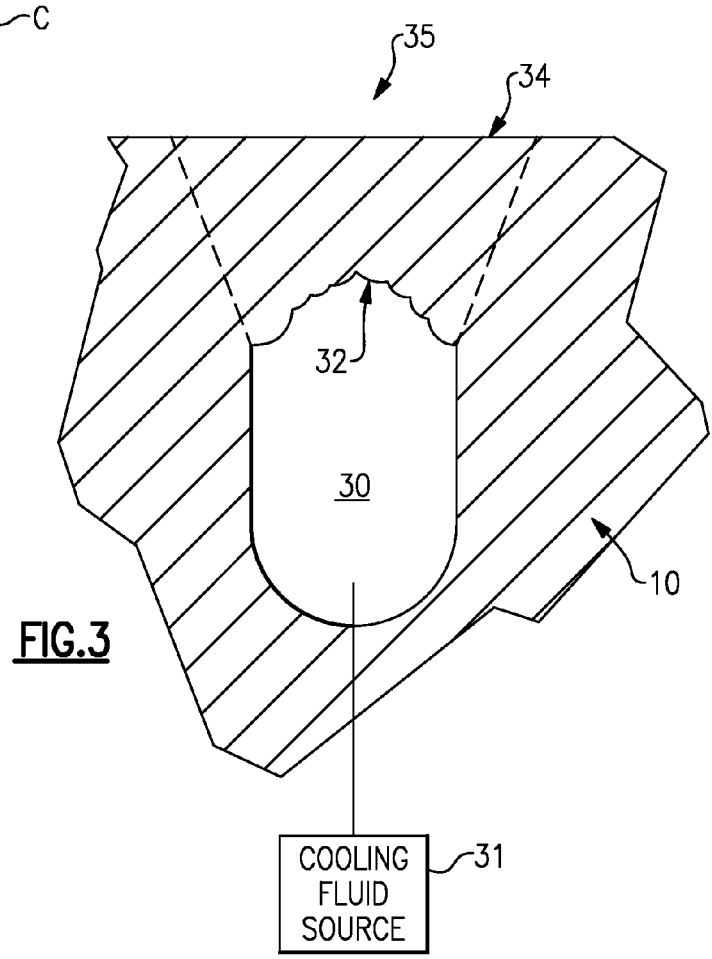
FIG. 3 is a cross-sectional view of an enclosed conformal cooling slot with an adjacent machined surface.

Referring to FIG. 3, the weld beads 28 provide a welded surface 32 of metal filler that, together with the cut conformal cooling slot 14, provides an enclosed conformal cooling passage 30. The finished conformal cooling passage 30 corresponds to a passage diameter of, for example, between ⅜ and ¾ inch. During use, the conformal cooling passages are fluidly connected to a cooling fluid source 31. Dashed lines indicate the previously present angled walls. The weld beads 28 and rough contoured surface 18 are machined to provide a class A machined surface 34 that corresponds to the finished moulded part shape.

Figure 4:
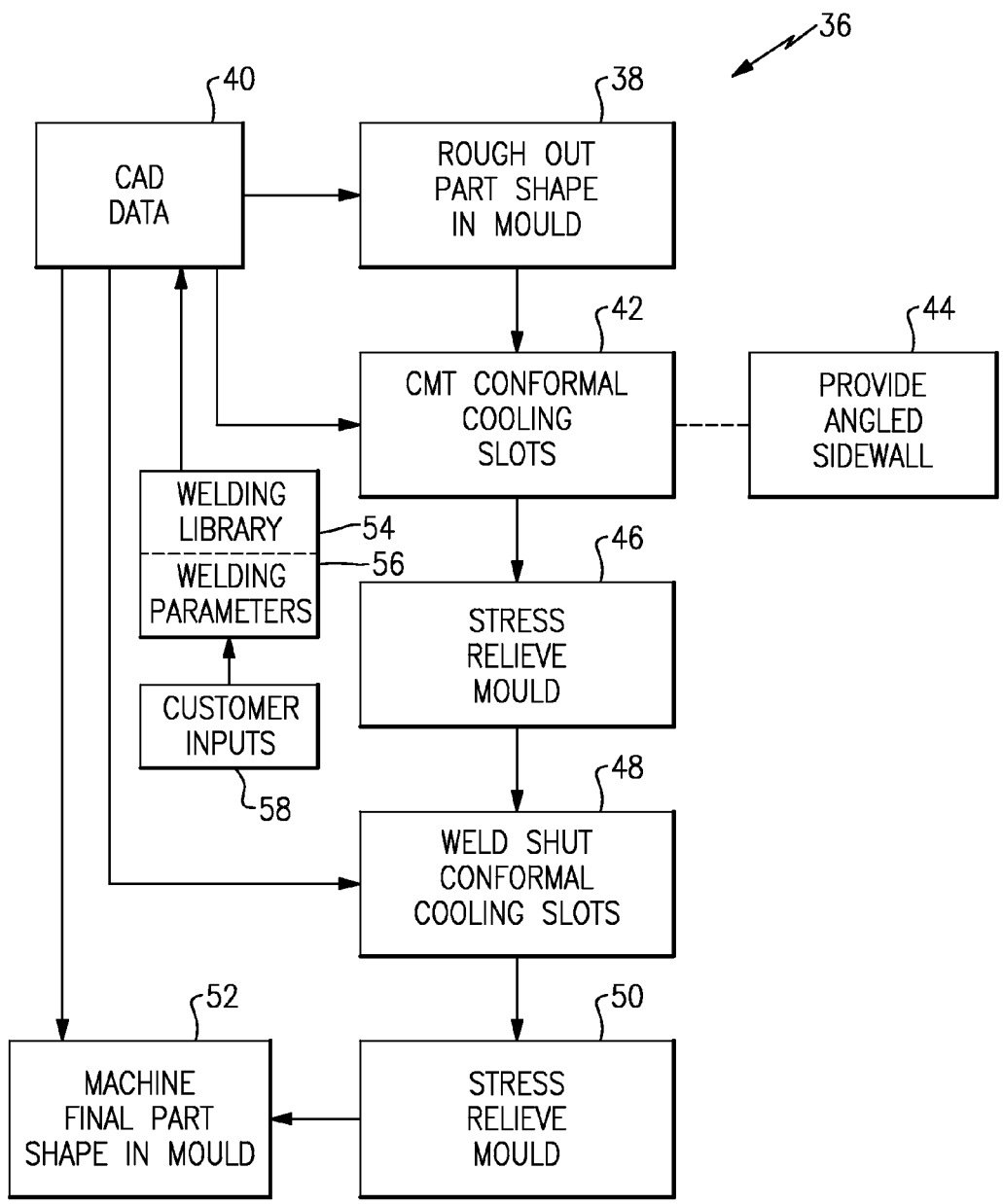
FIG. 4 is flowchart depicting a mould manufacturing method.

A mould manufacturing method 36 is schematically illustrated in FIG. 4. At least portions of the manufacturing method are provided by a controller (not shown), which may include hardware and/or software and temporary and/or permanent memory, for example, CAD data, robotic control algorithms and other information. CAD data 40 is used to rough out the part shape in the mould 10 to provide the rough mould cavity 12, as indicated at block 38. The cut conformal cooling slots 14 are machined, as indicated at block 42, in desired locations using the CAD data 40. Angled walls 22 are provided in cut conformal cooling slots 44 providing the welding torch adequate access, as indicated in block 44. The mould 10 is heated to provide stress relief, as indicated at block 46.

As indicated at block 48, weld beads 28 are robotically TIG welded onto the angled walls 22 using the CAD data 40 to create enclosed conformal cooling passages 30. The controller includes a welding library 54 in one example, which includes various welding parameters 56. The welding parameters may include, for example, travel speed of the welding torch, feed rate of the wire and welding current. The welding parameters are organized into sets of welding preferences associated with a conformal cooling passage size. For example, a ⅜ inch diameter cooling passage may include welding preferences of approximately 0.5 lb./hour wire feed rate a relatively low amperage and low welding torch speed. By way of contrast, a conformal cooling passage of approximately ¾ inch diameter may include welding preferences of 1.5 lb./hour wire feed rate and higher amperages and welding tip travel speed than that of a ⅜ inch conformal cooling passage. Thus, the welding step includes selecting from the predetermined set of welding preferences based upon the conformal cooling passage size. The available access for the welding torch may also affect the welding preferences.

The welding preferences are intended to accommodate all tool steels. The customer is permitted to provide a customer input 58 to vary some of the welding preferences by a predetermined amount. For example, customers may be permitted to vary the weld torch travel speed, wire feed rate and amperage by up to 10% to accommodate the customer's preferences and variations between different tool steels, for example.

The mould 10 is stress relieved after welding, as indicated at block 50. The weld beads 28 and rough contoured surface 18 are machined using CAD data 40 to provide a class A machined surface 34 corresponding to a finished part shape, as indicated in block 52.

Although an example embodiment has been disclosed, a worker of ordinary skill in this art would recognize that certain modifications would come within the scope of the claims. For example, although a vehicle bumper has been disclosed as an example moulded part, moulds for other large parts can benefit from the disclosed mould and method. For that reason, the following claims should be studied to determine their true scope and content.

What is claimed is:

1. A method of providing a mould with a conformal cooling passage comprising:
   rough machining a mould cavity generally corresponding to a moulded part shape using CAD data;
   cutting a conformal cooling slot in the mould cavity using the CAD data, wherein the conformal cooling slot includes an angled surface, the angled surface being angled relative to a centerline of the conformal cooling slot;
   welding shut the conformal cooling slot using the CAD data to provide conformal cooling passage, including laying weld beads on the angled surface and building up weld beads, on top of one another, inside the conformal cooling slot to weld shut the conformal cooling slot;
   after the conformal cooling slot is welded shut, building up weld beads on top of one another until weld beads are proud of an adjacent surface of the mould cavity; and
   machining surface over the conformal cooling passage corresponding to a mould part shape using the CAD data.

2. The method according to claim 1, wherein the angled surface is arranged at an obtuse angle relative to a true horizontal plane.

3. The method according to claim 1, wherein the conformal cooling slot includes a first depth and a second depth less than the first depth, the second depth including the angled surface and the first depth including welds generally parallel to one another.

4. The method according to claim 3, wherein the first depth is between approximately 1.5-2.5 inches.

5. The method according to claim 3, wherein the conformal cooling slot includes first and second widths, the second width greater than the first width with the second width including the angled surface.

6. The method according to claim 5, wherein the first width is between 0.125 and 0.75 inch.

7. The method according to claim 1, comprising providing a welding library including welding parameters organized in welding preferences corresponding to various conformal cooling passage sizes, selecting a set of welding preferences based upon the conformal cooling slot, and welding shut the conformal cooling slot using the selected welding preferences.

8. The method according to claim 7, wherein the conformal cooling slot includes first and second widths, the second width greater than the first width with the second width including the angled surface, and wherein the welding preferences are selected based upon the second width.

9. The method according to claim 7, comprising providing customer input to vary the welding preferences.

10. The method according to claim 9, wherein the welding parameters and welding preferences include welding torch travel speed, wire feed rate and welding amperage.

11. The method according to claim 9, comprising limiting the customer input to a predetermined variation from the welding preferences.

12. The method according to claim 1, wherein the conformal cooling slot includes a depth, a width, and a length, the length substantially greater than the depth and the width.

13. The method according to claim 1, wherein the angled surface is angled within a range of 10-20° relative to the centerline of the conformal cooling slot.

14. The method according to claim 1, wherein the step of machining the surface over the conformal cooling passage includes machining the weld beads down to a point where the weld beads are even with the adjacent surface of the mould cavity.

15. The method according to claim 1, wherein said welding step is performed by TIG welding.

16. The method according to claim 1, wherein the conformal cooling slot includes first and second angled surfaces on opposed sides of the conformal cooling slot, each of the first and second angled surfaces angled relative to a centerline of the conformal cooling slot.

17. The method according to claim 16, wherein the conformal cooling slot is welded shut with a first number of weld beads spanning between the first and second angled surfaces.

18. The method according to claim 17, wherein, after the first number of weld beads are provided between the first and second angled surfaces, additional weld beads are built up on top of the first number of weld beads until the additional weld beads are proud of an adjacent surface of the mould cavity.

19. A method of providing a mould with a conformal cooling passage comprising:
   providing a mould cavity generally corresponding to a moulded part shape;
   cutting a conformal cooling slot in the mould cavity, wherein the conformal cooling slot includes an angled surface, the angled surface being angled relative to a centerline of the conformal cooling slot;
   welding shut the conformal cooling slot using CAD data to provide a conformal cooling passage, including laying weld beads on the angled surface and building up weld beads, on top of one another, inside the conformal cooling slot to weld shut the conformal cooling slot;
   after the conformal cooling slot is welded shut, building up weld beads on top of one another until weld beads are proud of an adjacent surface of the mould cavity; and
   machining a surface over the conformal cooling passage corresponding to a mould part shape.

20. The method according to claim 19, wherein the cutting step is performed using the CAD data.

21. The method according to claim 19, wherein the machining step is performed using the CAD data.

* * * * *